US010909127B2

(12) United States Patent
Safronov et al.

(10) Patent No.: US 10,909,127 B2
(45) Date of Patent: Feb. 2, 2021

(54) METHOD AND SERVER FOR RANKING DOCUMENTS ON A SERP

(71) Applicant: YANDEX EUROPE AG, Lucerne (CH)

(72) Inventors: Aleksandr Valerievich Safronov, Serpukhov (RU); Ilnur Maskhudovich Khuziev, Moscow (RU); Aleksandr Nikolaevich Gotmanov, dp Lesnoy Gorodok (RU)

(73) Assignee: YANDEX EUROPE AG, Lucerne (CH)

( * ) Notice: Subject to any disclaimer, the term of this patent is extended or adjusted under 35 U.S.C. 154(b) by 242 days.

(21) Appl. No.: 16/254,845

(22) Filed: Jan. 23, 2019

(65) Prior Publication Data

US 2020/0012652 A1     Jan. 9, 2020

(30) Foreign Application Priority Data

Jul. 3, 2018    (RU) .................................. 2018124344

(51) Int. Cl.
*G06F 16/2457*    (2019.01)
*G06F 16/9538*    (2019.01)
(Continued)

(52) U.S. Cl.
CPC ...... *G06F 16/24578* (2019.01); *G06F 16/248* (2019.01); *G06F 16/953* (2019.01); *G06F 16/9535* (2019.01); *G06F 16/9538* (2019.01)

(58) Field of Classification Search
CPC ............. G06F 16/24578; G06F 16/951; G06F 16/9535; G06F 16/248; G06F 16/953
See application file for complete search history.

(56) References Cited

U.S. PATENT DOCUMENTS

| 7,251,648 B2 | 7/2007 | Chaudhuri |
| 7,383,262 B2 | 6/2008 | Das et al. |

(Continued)

FOREIGN PATENT DOCUMENTS

| RU | 2580516 C2 | 4/2016 |
| RU | 2608886 C2 | 1/2017 |
| WO | 2013075272 A1 | 5/2013 |

OTHER PUBLICATIONS

Danushka Bollegala et al., Measuring Semantic Similarity between Words using Web Search Engines, The University of Tokyo, Hongo 7-3-1, Tokyo, 113-8656, Japan, Jul. 22, 2008; retrieved from http://citeseerx.ist.psu.edu/viewdoc/summary?doi=10.1.1.461.5798 on Nov. 29, 2018.

(Continued)

*Primary Examiner* — James Trujillo
*Assistant Examiner* — Fariborz Khoshnoodi
(74) *Attorney, Agent, or Firm* — BCF LLP

(57) ABSTRACT

A method and a server for ranking documents in response to a current query are disclosed. The documents are to be presented on a SERP. A database stores stored search pairs in association with respective pair-specific values. The method comprises for the current query, ranking, by a MLA, relevant documents to be included in the SERP which have preliminary ranks. The current query and a respective relevant document form a current search pair. The method comprises, for a given current search pair, generating a rank-adjustment score associated with a stored search pair based on: the pair-specific value of the stored search pair, and a pair-wise similarity between the current search pair and the stored search pair. The method comprises, for the current query, re-ranking a relevant document of the current search pair on the SERP using the associated rank-adjustment score.

20 Claims, 8 Drawing Sheets

(51) Int. Cl.
*G06F 16/9535* (2019.01)
*G06F 16/953* (2019.01)
*G06F 16/248* (2019.01)

(56) References Cited

U.S. PATENT DOCUMENTS

| | | | |
|---|---|---|---|
| 7,827,172 | B2 | 11/2010 | Zaragoza |
| 8,375,049 | B2 | 2/2013 | Bailey et al. |
| 9,009,146 | B1 | 4/2015 | Lopatenko et al. |
| 9,064,016 | B2 * | 6/2015 | Shokouhi ............ G06F 16/9535 |
| 9,251,292 | B2 | 2/2016 | Cheng et al. |
| 2008/0114750 | A1 | 5/2008 | Saxena et al. |
| 2009/0132515 | A1 * | 5/2009 | Lu .......................... G06N 20/20 |
| 2010/0057714 | A1 | 3/2010 | Miedema |
| 2010/0169323 | A1 | 7/2010 | Liu et al. |
| 2012/0271806 | A1 * | 10/2012 | Ieong ................. G06F 16/9535 |
| | | | 707/706 |
| 2013/0262455 | A1 | 10/2013 | Cramer et al. |
| 2017/0185681 | A1 | 6/2017 | Myltsev et al. |
| 2017/0344554 | A1 * | 11/2017 | Ha ........................ G06F 16/248 |
| 2018/0293242 | A1 * | 10/2018 | Shishkin ............. G06F 16/9535 |

OTHER PUBLICATIONS

Ortega et al., Supporting Ranked Boolean Similarity Queries in MARS, IEEE Transactions on Knowledge and Data Engineering, vol. 10, No. 6, Nov./Dec. 1998; retrieved from https://www.microsoft.com/en-us/research/wp-content/uploads/2016/02/ranked_boolean_queries_mars.pdf on Nov. 29, 2018.
Russian Search Report dated Jan. 29, 2020 in respect of the related Russian Patent Application RU2018124344.

* cited by examiner

METHOD AND SERVER FOR RANKING DOCUMENTS ON A SERP

CROSS-REFERENCE

The present application claims priority to Russian Patent Application No. 2018124344, filed on Jul. 3, 2018, entitled "Method and Server for Ranking Documents on a SERP," the entirety of which is incorporated herein by reference.

FIELD

The present technology relates to Search Engine Results Pages (SERPS) in general and, specifically, to a method and server for ranking documents on a SERP.

BACKGROUND

The Internet provides access to a wide variety of resources, for example, video files, image files, audio files, or Web pages. Search engines are used to search these resources. For example, digital images that satisfy a user's informational need can be identified by a search engine in response to receiving a user query submitted by a user. User queries can be composed of one or more query terms. The search system selects and ranks search results based on their relevance to the user query and/or on their importance relative to other search results and also provides top search results to the user.

Many state-of-the-art ranking algorithms are employed in order to rank search results on a given Search Engine Results Page (SERP) that is generated and provided to a user having submitted a query.

SUMMARY

Developers of the present technology have appreciated certain technical drawbacks associated with the existing search systems. Conventional systems aim at providing a SERP where search results are adequately ranked based on their relevance to a search query. However, in some cases, some search results either (i) may not be adequately ranked due to various shortcomings of the ranking system of conventional search engines or (ii) may be ranked low on the SERP but can nevertheless be useful for satisfying the search needs of a user. This, in turn, can lead to a decreased usefulness of the SERP as a whole for the user performing the search.

It is an object of the present technology to ameliorate at least some of the inconveniences present in the prior art.

Therefore, developers of the present technology have devised servers and methods which allow relevant documents to be initially ranked by the ranking system of a search engine, and then re-ranked on the SERP so as to increase the usefulness of the SERP as a whole in response to a current search query of a current user. Although conventional ranking system implemented may be somewhat well suited for estimating a relevance of a given document to a given query (and ranking them based on the respectively estimated relevance), in some cases, re-ranking at least some relevant documents on the SERP may potentially result in a more useful SERP as a whole for the current user.

To that end, developers of the present technology have developed methods for generating a rank-adjustment score for a given current search pair and for using the rank-adjustment score for re-ranking a respective relevant document in the given current search pair so that a new rank of the respective relevant document is different from its preliminary rank having been assigned based on a base-line ranking score generated for the respective relevant document by the one or more MLAs during the initial ranking.

It can be said that the developers of the present technology have developed methods for boosting the respective base-line ranking score generated by the one or more MLAs by the respective rank-adjustment score so as to re-rank the relevant documents on the SERP based on the so-boosted base-line rankings scores. The SERP with so-re-ranked relevant documents may be more useful as a whole for the current user than the SERP where the relevant documents are not re-ranked.

In accordance with a first broad aspect of the present technology, there is provided a method of ranking documents in response to a current query. The documents are to be presented on a search engine results page (SERP). The current query has been received from a user device associated with a user. The SERP is to be displayed to the user by the user device. The method is executable by a server communicatively coupled to the user device and which has access to a database. The database stores a plurality of stored search pairs in association with respective pair-specific values. A given pair-specific value for a given stored search pair is indicative of a usefulness of a given document in the given stored search pair for a given query in the given stored search pair. The method comprises, for the current query, ranking, by the server implementing a Machine Learning Algorithm (MLA), a plurality of relevant documents to be included in the SERP responsive to the current query. The plurality of relevant documents is associated with respective preliminary ranks on the SERP. The current query and a respective one of the plurality of relevant documents form a respective current search pair. The method comprises, for a given current search pair, generating, by the server, a rank-adjustment score associated with a given stored search pair of the plurality of stored search pairs based on: the pair-specific value of the given stored search pair, and a pair-wise similarity between the current search pair and the given stored search pair. The method also comprises, for the current query, re-ranking, by the server, a given relevant document of the given current search pair on the SERP by using the associated rank-adjustment score such that the given relevant document is associated with a rank on the SERP that is different from the respective preliminary rank on the SERP.

In some implementations of the method, the given stored search pair is selected such that the rank-adjustment score for the given current search pair is a highest one amongst the plurality of stored search queries.

In some implementations of the method, for the given current search pair, the generating the rank-adjustment score comprises: (i) generating, by the server, a plurality of potential rank-adjustment scores associated with respective ones of the plurality of stored search pairs based on the pair-specific value of a respective stored search pair and a pair-wise similarity between the given current search pair and the respective stored search pair, and (ii) selecting, by the server, a highest one amongst the plurality of potential rank-adjustment scores as the rank-adjustment score.

In some implementations of the method, for the given current search pair, the generating the rank-adjustment score comprises: (i) generating, by the server, a plurality of potential rank-adjustment scores associated with respective ones of the plurality of stored search pairs based on the pair-specific value of a respective stored search pair and a pair-wise similarity between the given current search pair and the respective stored search pair; and (ii) selecting, by the server, a pre-determined number of topmost ones of the plurality of potential rank-adjustment scores as the rank-adjustment score.

In some implementations of the method, the selecting further comprises averaging the topmost ones of the plurality of potential rank-adjustment scores to determine the rank-adjustment score.

In some implementations of the method, the method further comprises: generating, by the server, a respective rank-adjustment score for each current search pair, and using, by the server, the rank-adjustment scores for re-ranking the relevant documents of the respective current search pairs on the SERP for the current query.

In some implementations of the method, the using the rank-adjustment scores comprises re-ranking, by the server, the relevant documents on the SERP with respect to each other for the current query based on a combination of (i) the respective rank-adjustment scores and (ii) respective base-line ranking scores determined by the MLA.

In some implementations of the method, the stored search pairs is one of: a past search pair and an assessor-marked search pair.

In some implementations of the method, the respective base-line ranking scores are determined by the MLA based on (i) features of the respective relevant documents and (ii) features of the current query.

In some implementations of the method, the method further comprises determining the pair-wise similarity between the current search pair and the given stored search pair based on at least one of (i) a similarity of the current query with a given query of the given stored search pair and (ii) a similarity of the respective relevant document of the given current search pair and the respective document of the given stored search pair.

In a second broad aspect of the present technology, there is provided a server for ranking documents in response to a current query. The documents are to be presented on a search engine results page (SERP). The current query has been received from a user device associated with a user. The SERP is to be displayed to the user by the user device. The server is communicatively coupled to the user device and has access to a database. The database stores a plurality of stored search pairs in association with respective pair-specific values. A given pair-specific value for a given stored search pair is indicative of a usefulness of a given document in the given stored search pair for a given query in the given stored search pair. The server is configured to, for the current query, rank, by implementing a Machine Learning Algorithm (MLA), a plurality of relevant documents to be included in the SERP responsive to the current query. The plurality of relevant documents is associated with respective preliminary ranks on the SERP. The current query and a respective one of the plurality of relevant documents form a respective current search pair. The server is configured to, for a given current search pair, generate a rank-adjustment score associated with a given stored search pair of the plurality of stored search pairs based on: the pair-specific value of the given stored search pair, and a pair-wise similarity between the current search pair and the given stored search pair. The server is also configured to, for the current query, re-rank a given relevant document of the given current search pair on the SERP using the associated rank-adjustment score such that the given relevant document is associated with a rank on the SERP that is different from the respective preliminary rank on the SERP.

In some implementations of the server, the given stored search pair is selected such that the rank-adjustment score for the given current search pair is a highest one amongst the plurality of stored search queries.

In some implementations of the server, for the given current search pair, the server configured to generate the rank-adjustment score comprises the server configured to: generate a plurality of potential rank-adjustment scores associated with respective ones of the plurality of stored search pairs based on the pair-specific value of a respective stored search pair and a pair-wise similarity between the given current search pair and the respective stored search pair, and select a highest one amongst the plurality of potential rank-adjustment scores as the rank-adjustment score.

In some implementations of the server, for the given current search pair, the server configured to generate the rank-adjustment score comprises the server configured to: generate a plurality of potential rank-adjustment scores associated with respective ones of the plurality of stored search pairs based on the pair-specific value of a respective stored search pair and a pair-wise similarity between the given current search pair and the respective stored search pair, and select a pre-determined number of topmost ones of the plurality of potential rank-adjustment scores as the rank-adjustment score.

In some implementations of the server, the server configured to select further comprises the server configured to average the topmost ones of the plurality of potential rank-adjustment scores to determine the rank-adjustment score.

In some implementations of the server, the server is further configured to: generate a respective rank-adjustment score for each current search pair, and use the rank-adjustment scores for re-ranking the relevant documents of the respective current search pairs on the SERP for the current query.

In some implementations of the server, the server configured to use the rank-adjustment scores comprises the server configured to re-rank the relevant documents on the SERP with respect to each other for the current query based on a combination of the respective rank-adjustment scores and respective base-line ranking scores determined by the MLA.

In some implementations of the server, the stored search pairs is one of: a past search pair and an assessor-marked search pair.

In some implementations of the server, the respective base-line ranking scores are determined by the MLA based on (i) features of the respective relevant documents and (ii) features of the current query.

In some implementations of the server, the server is further configured to determine the pair-wise similarity between the current search pair and the given stored search pair based on at least one of (i) a similarity of the current query with a given query of the given stored search pair and (ii) a similarity of the respective relevant document of the given current search pair and the respective document of the given stored search pair.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
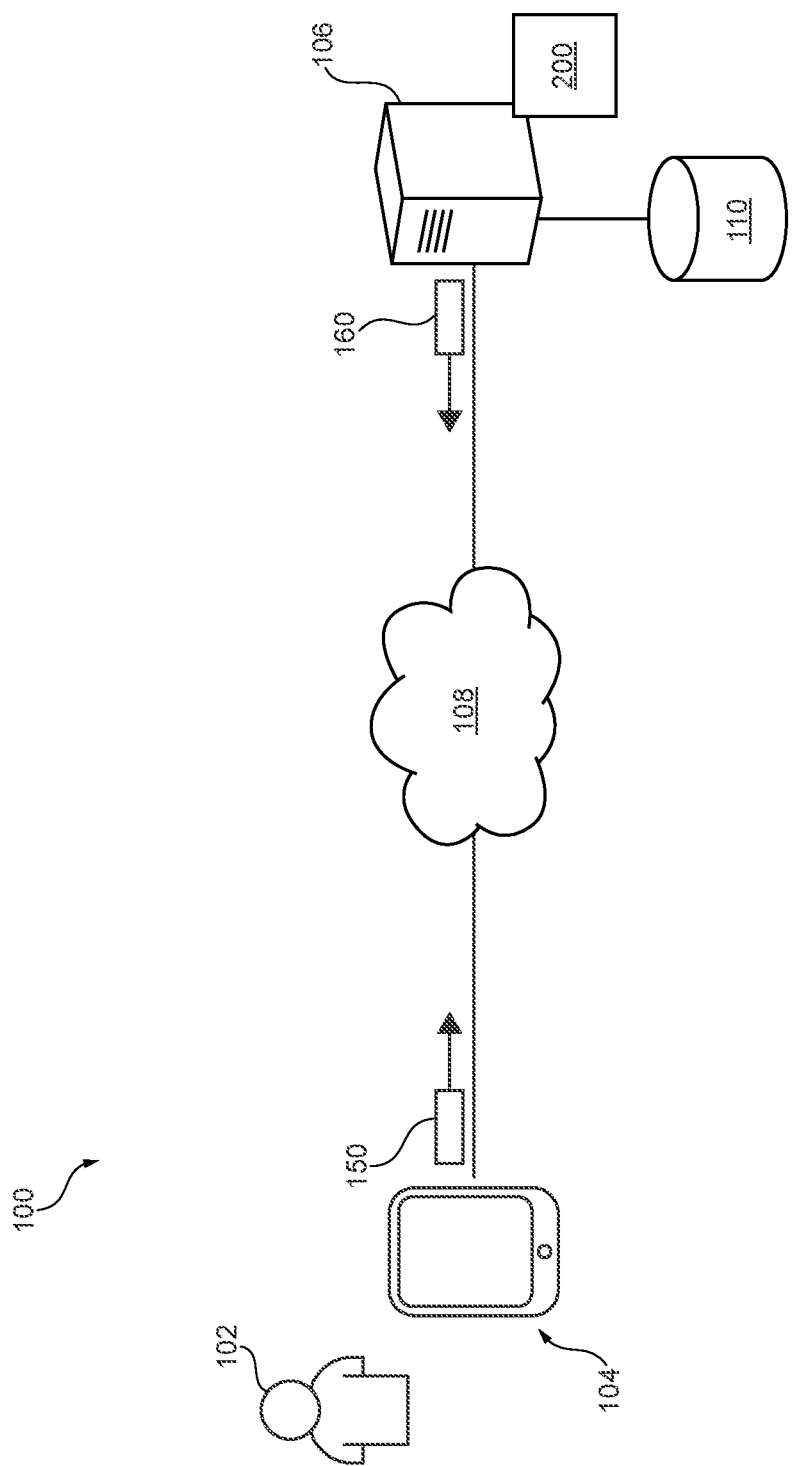
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to generate and provide a given Search Engine Results Page (SERP), comprising various search results, to an electronic device 104 for display thereof to a user 102 in response to a given query provided by the user 102. At least some components of the system 100 will now be described, however, it should be understood that other components to those depicted in FIG. 1 may be part of the system 100 without departing from the scope of the present technology.

Electronic Device

The system 100 comprises the electronic device 104, the electronic device 104 being associated with the user 102. As such, the electronic device 104 can sometimes be referred to as a "client device", "end user device", "client electronic device" or simply "device". It should be noted that the fact that the device 104 is associated with the user 102 does not need to suggest or imply any mode of operation—such as a need to log in, a need to be registered, or the like.

The implementation of the device 104 is not particularly limited, but as an example, the device 104 may be implemented as a personal computer (desktops, laptops, netbooks, etc.), a wireless communication device (such as a smartphone, a cell phone, a tablet and the like), as well as network equipment (such as routers, switches, and gateways). The device 104 comprises hardware and/or software and/or firmware (or a combination thereof), as is known in the art, to execute a given browser application. Generally speaking, the purpose of the given browser application is to enable the user 102 to access one or more web resources. How the given browser application is implemented is not particularly limited. One example of the given browser application may be embodied as a Yandex™ browser.

In some embodiments of the present technology, the given browser application implemented by the device 104 may allow the user 102 to submit search queries to a given search engine (for example, hosted by a server 106) and display SERPs responsive to submitted queries to the user 102. Generally speaking, the given search engine is a system configured to receive queries from plurality of users, search for information responsive to the received queries and generate SERPs comprising search results that are ranked based on their relevance to the received queries. Some examples of the given search engine may be embodied as a Yandex™ search engine, Google™ search engine, Yahoo™ search engine, and the like.

For example, the user 102 may use the given browser application to input/submit a current query and the device 104 may be configured to generate a query data-packet 150 comprising data indicative of the current query of the user 102. It is contemplated that a plurality of data-packets may be generated by a plurality of devices of the system 100 similarly to how the device 104 is configured to generate the query data-packet 150 based on the current query inputted/submitted by the user 102 into the given browser application, without departing from the scope of the present technology.

Communication Network

The device 104 is communicatively coupled to the communication network 108 for accessing the given search engine of the server 106. In some non-limiting embodiments of the present technology, the communication network 108 can be implemented as the Internet. In other non-limiting embodiments of the present technology, the communication network 108 can be implemented differently, such as any wide-area communication network, local-area communication network, a private communication network and the like. How a communication link (not separately numbered) between the device 104 and the communication network 108 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

The communication network 108 is configured to transmit inter alia the query data-packet 150 from the device 104 to the server 106 and a SERP data-packet 160 from the server 106 to the device 104. For example, the SERP data-packet 160 may comprise data indicative of a given SERP generated by the server 106 and which comprises search results responsive the current query of the user 102. How the server 106 is configured to generate the SERP data-packet 160 and the given SERP will be described in greater detail herein below.

Server

The system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 can be under control and/or management of a search engine provider (not depicted), such as, for example, an operator of the given search engine (e.g., Yandex™ search engine). Hence, as previously mentioned, the server 112 can host the given search engine. As such, the server 106 may be configured to execute one or more information searches responsive to queries submitted by users of the given search engine.

Figure 2:
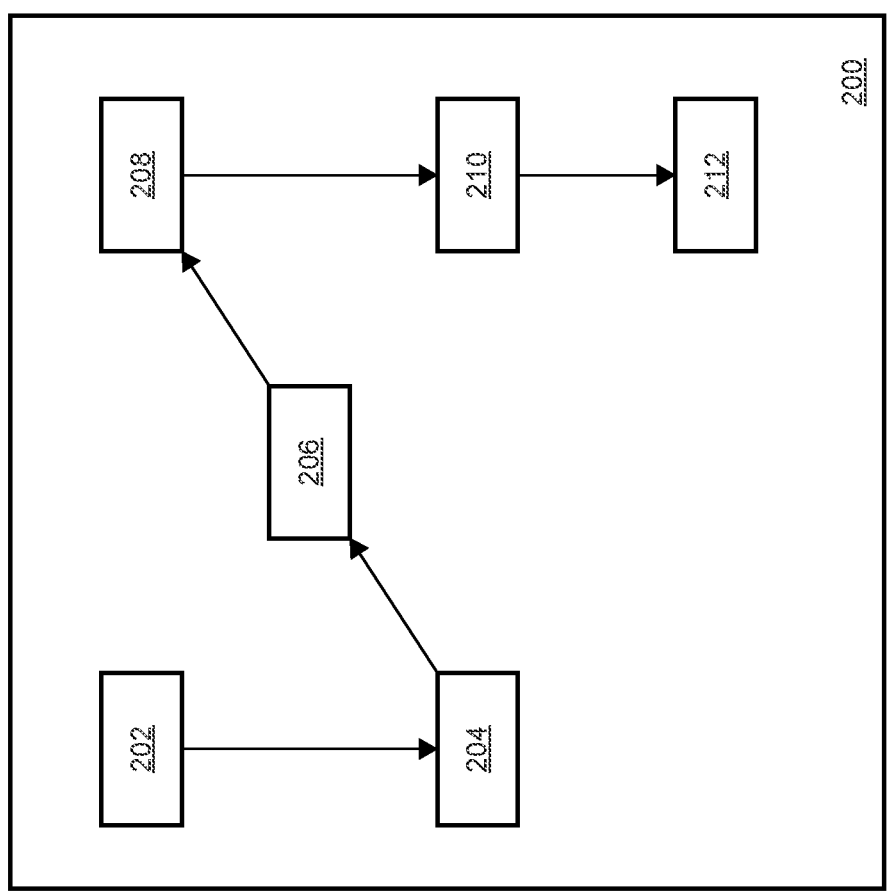
FIG. 2 depicts a plurality of computer-implemented procedures executable by the server of the system of FIG. 1 in accordance with non-limiting embodiments of the present technology.

The server 106 is configured to execute at least some of the plurality of computer-implemented procedures 200, which will now be described with reference to FIG. 2. It should be understood that the server 106 may also execute additional computer-implemented procedures to those non-exhaustively depicted in FIG. 2 and without departing from the scope of the present technology.

The server 106 may be configured to execute a document discovery procedure 202, which is generally used by the server 106 for discovering documents available over the communication network 108. For example, the server 106 may be configured to execute a "crawler" application that "visits" network resources available over the communication network 108 and downloads them for further processing.

The nature of documents that the server 106 is configured to visit and download is not particularly limiting but, for sake of illustration only, the documents described herein may be representative of web pages that are available over the communication network 108.

The server 106 may also be configured to execute an indexing procedure 204, which is generally used by the server 106 for building and/or maintaining indexing structures employed by the given search engine for performing searches. For example, the server 106 may be configured to build and/or maintain an inverted index.

How the inverted index is implemented in the present technology is not particularly limiting but, just as an example, the inverted index basically comprises a number of posting lists each on which is associated with a respective "searchable term". A given posting in a given posting list includes some type of data that is indicative of a given document that includes the searchable term associated with the given posting list and, optionally, includes some additional data. In summary, every posting list corresponds to a searchable term, and comprises a series of postings referencing each of the discovered documents that contain at least one occurrence of that respective searchable term.

It should be mentioned that additional data may also be found in a given posting; for example, the number of occurrences of a given searchable term in a given document; whether this search term occurs in the title of the given document, etc. Naturally, this additional data may be different depending on the given search engine and inter alia various implementations of the present technology.

Searchable terms are typically, but not exclusively, words or other character strings. A given search engine may typically deal with practically every word in a number of different languages, as well as proper names, numbers, symbols, etc. A very commonly used word may have a posting list of as long as one billion postings (or even more). In some embodiments of the present technology, the search query can also be an image-based search query for searching "look alike" images.

The server 106 may also be configured to execute a querying procedure 206, which is generally used by the server 106 for identifying documents that may contain some part of a given query submitted to the given search engine. For example, when a given query (such as the current query of the user 102, for example) is received by the server 106, the server 106 may parse the given query into a plurality of searchable terms. The server 106 may then access the inverted index and identify posting lists that are associated with at least one of the plurality of searchable terms. As a result, the server 106 may access at least some postings in the so-identified posting lists and identify at least some documents that may contain at least some of the plurality of searchable terms of the given query.

The server 106 may also be configured to execute a base-line relevance estimation procedure 208, which is generally used to estimate a relevance of a given document to a given query. For example, the server 106 may be configured to implement one or more Machine Learning Algorithms (MLAs) that have been trained to estimate a relevance of a given document to a given query based on inter alia (i) features of the given document and (ii) features of the given query. How the one or more MLAs are trained and then used in order to estimate relevance of documents to a given query is described in a US patent publication number US 2017/0185681, entitled "METHOD OF AND SYSTEM FOR PROCESSING A PREFIX ASSOCIATED WITH A SEARCH QUERY", filed on Dec. 1, 2016, content of which is incorporated herein by reference in its entirety and, therefore, will not be described in greater detail herein.

How the server 106 is configured to execute the base-line relevance estimation procedure 208 for the current query of the user 102 will be described with reference to FIG. 4 herein further below.

It should be noted that, in some embodiments of the present technology, the execution of the base-line relevance estimation procedure 208 may result in the server 106 ranking documents with respect to one another based on respective base-line ranking scores that are indicative of the estimated relevance of the respective documents to a given query. In other words, it is contemplated that the server 106 may generate a given SERP where documents are associated with respective preliminary ranks based on their respective base-line ranking scores. As it will be described below, in addition to the ranking based on the respective base-line ranking scores, the server 106 is also configured to re-rank at least some documents on a given SERP in order to potentially increase a usefulness of the SERP as a whole.

The server 106 may also be configured to execute a pair-wise similarity determination procedure 210, which is generally used by the server 106 in order to determine how similar a given query-document pair is to another given query-document pair. In the context of the present specification, a query-document pair may also be referred to as a given "search pair" for the sake of simplicity.

How the server 106 is configured to execute the pair-wise similarity determination procedure 210 on at least some search pairs will be described with reference to FIG. 5 herein further below.

The server 106 may also be configured to execute a rank-adjustment score determination procedure 212, which is generally used by the server 106 for generating rank-adjustment scores for documents for re-ranking at least some documents on the SERP where documents are associated with respective preliminary ranks. In other words, the execution of the rank-adjustment score determination procedure 212 may result in the server 106 re-ranking documents with respect to one another at least partially based on the respective rank-adjustment scores. This means that at least one document on the SERP, following such a re-ranking of the documents, may be associated with a new rank that is different from its respective preliminary rank.

It is contemplated that in some embodiments of the present technology, the execution of the rank-adjustment score determination procedure 212 may allow generating by the server 106 rank-adjustments scores for documents on the SERP that, in a sense, "boost" base-line ranking scores of the respective documents. As a result, some documents on the SERP may have different ranks following this "boosting", as compared to their respective preliminary ranks. This may result in generation of a more useful SERP as a whole in response to the given query.

Database

Returning to the description of FIG. 1, there is depicted a database 110 communicatively coupled to the server 106 and is configured to store information extracted or otherwise determined or generated by the server 106. Generally speaking, the database 110 may receive data from the server 106 which was extracted or otherwise determined or generated by the server 106 during processing for temporary and/or permanent storage thereof and may provide stored data to the server 106 for use thereof. It is contemplated that the database 110 may be split into several distributed databases without departing from the scope of the present technology.

In some embodiments of the present technology, the database 110 may be configured to host the inverted index that the server 106 may be configured to build and/or maintain. In other words, the database 110 may be configured to store the plurality of posting lists associated with respective searchable terms, as explained above.

Figure 3:
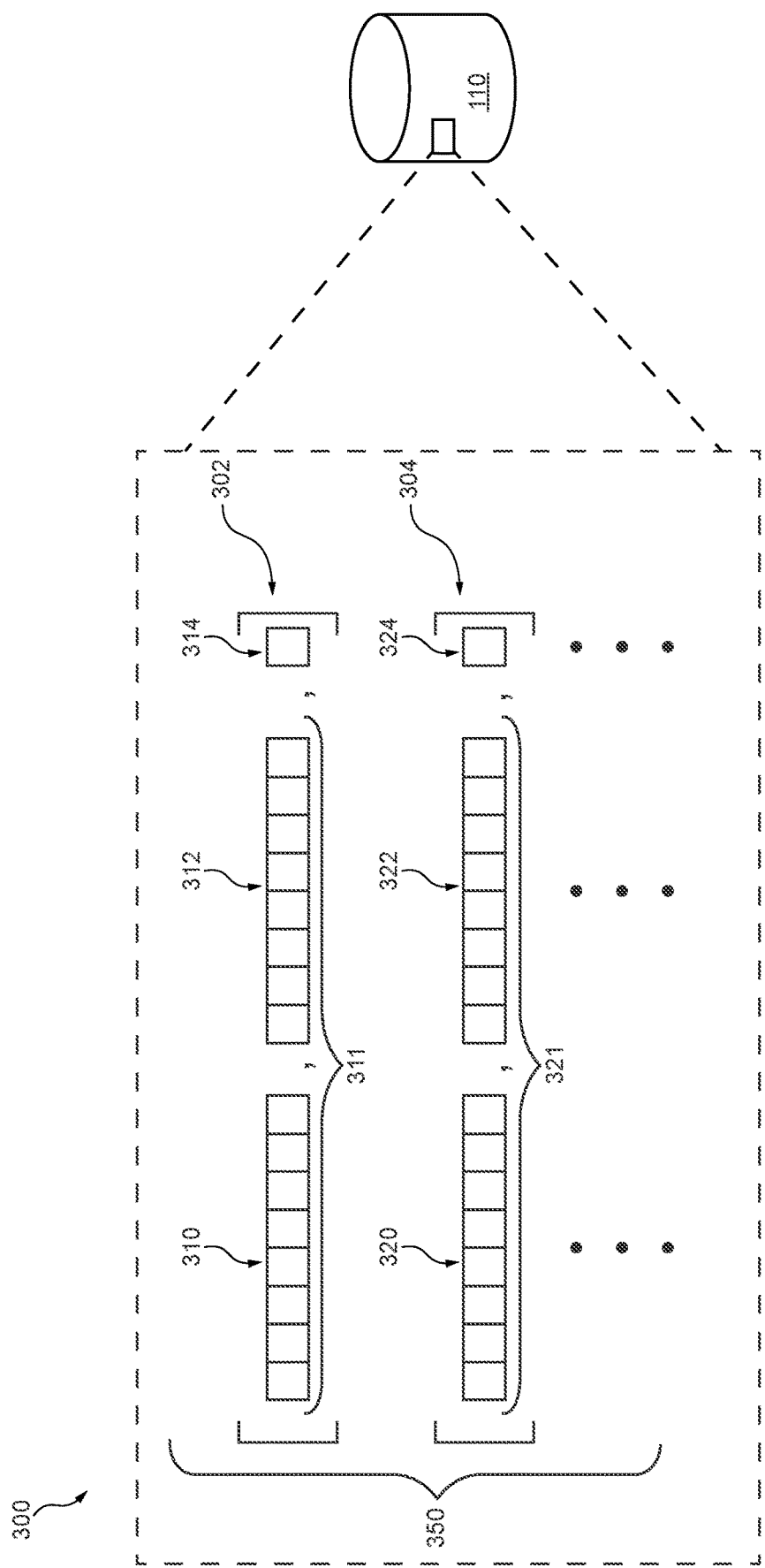
FIG. 3 depicts stored search pair data comprising a plurality of stored search pair records that are stored in the database of the system of FIG. 1 in accordance with non-limiting embodiments of the present technology.

In other embodiments, it is contemplated that the database 110 may store stored search pair data 300 as depicted in FIG. 3. For example, the server 106 may be configured to use the stored search pair data 300 during the pair-wise similarity determination procedure 210 and during the rank-adjustment score determination procedure 212, as it will be described herein further below.

The stored search pair data 300 may comprise inter alia a plurality of stored search pair records 350. For example, the plurality of stored search pair records 350 may comprise a large number of stored search pair records, such as (i) a first stored search pair record 302, (ii) a second stored search pair records 304 and (iii) other stored search pair records.

It should be mentioned that a given stored search pair record may comprise (i) a respective stored search pair and (ii) a respective pair-specific value. For example, the first stored search pair record 302 comprises (i) a first stored search pair 311, which includes an indication of a first query 310 and of a first document 312 and (ii) a first pair-specific value 314. By the same token, the second stored search pair record 304 comprises (i) a second stored search pair 321, which includes an indication of a second query 320 and of a second document 322 and (ii) a second pair-specific value 324.

It should be understood that, the first stored search pair 311 including the indication of the first query 310 does not mean that other stored search pairs may not include the indication of the first query 310. Indeed, more than one stored search pairs may include an indication of the same given query. Similarly, the first stored search pair 311 including the indication of the first document 312 does not mean that other stored search pairs may not include the indication of the first document 312. Indeed, more than one stored search pair may include an indication of a given document.

A given pair-specific value is indicative of usefulness of a given document in a respective stored search pair for a given query in the respective stored search pair. For example, the first pair-specific value 314 is indicative of a usefulness of the first document 312 for the first query 310. In another example, the second pair-specific value 324 is indicative of a usefulness of the second document 322 for the second query 320.

The plurality of stored search pair records 350 may be gathered and stored by the server 106 in the database 110 in many ways.

In some embodiments, the plurality of stored search pair records 350 may be gathered and stored by the server 106 following human assessment of the respective stored search pairs. For example, a given human assessor may be (i) presented with the first query 310 and the first document 312, and (ii) tasked with rating the usefulness of the first document 312 for the first query 310. As a result, the server 106 may generate the first pair-specific value 314 based on the rating of usefulness of the given human assessor and store it accordingly as part of the first stored search pair record 302 in association with the first stored search pair 311. It can thus be said that at least some of the stored search pairs in the database 110 may be assessor-marked search pairs.

In other embodiments, the plurality of stored search pair records 350 may be gathered and stored by the server 106 based on (i) past queries submitted to the given search engine, (ii) past documents provided in response to the respective past queries, and (iii) past user interactions with the past documents. For example, the server 106 may be configured to analyze user interactions that have been performed by users of the given search engine when presented with given documents in response to given queries. The server 106 may be configured to estimate, based on the user interactions, how useful the given documents were for the given queries and use this estimated usefulness for generating the respective pair-specific values. It can thus be said that at least some of the stored search pairs in the database 110 may be past search pairs.

It is contemplated that a given pair-specific value is indicative of a usefulness of a given document to a respective query and may be measured and/or expressed in different ways. For example, in cases where a given stored search pair is a given assessor-marked search pair, the usefulness of the respective document to the respective query may be an estimated Click-Through-Rate (CTR) of the respective document based on the assessors rating of the respective document. In another example, in cases where a given stored search pair is a given past search pair, the usefulness of the respective document to the respective query may be a past CTR of the respective document as determined by the server 106.

As previously explained, the user 102 may use the given browser application to input/submit the current query and the device 104 may be configured to generate the query data-packet 150 comprising data indicative of the current query of the user 102. The query data-packet 150 is transmitted via the communication network 108 and is received by the server 106, which results in a provision of the data indicative of the current query to the given search engine.

The server 106 may be configured to execute the querying procedure 206 for identifying relevant documents for the current query as explained above. It should be noted that the current query and the relevant documents may be vectorized or, in other words, treated in a form of vectors. Various "word2vec" methods and other vectorization methods may be used for achieving this vector format of queries and documents without departing from the scope of the present technology.

Figure 4:
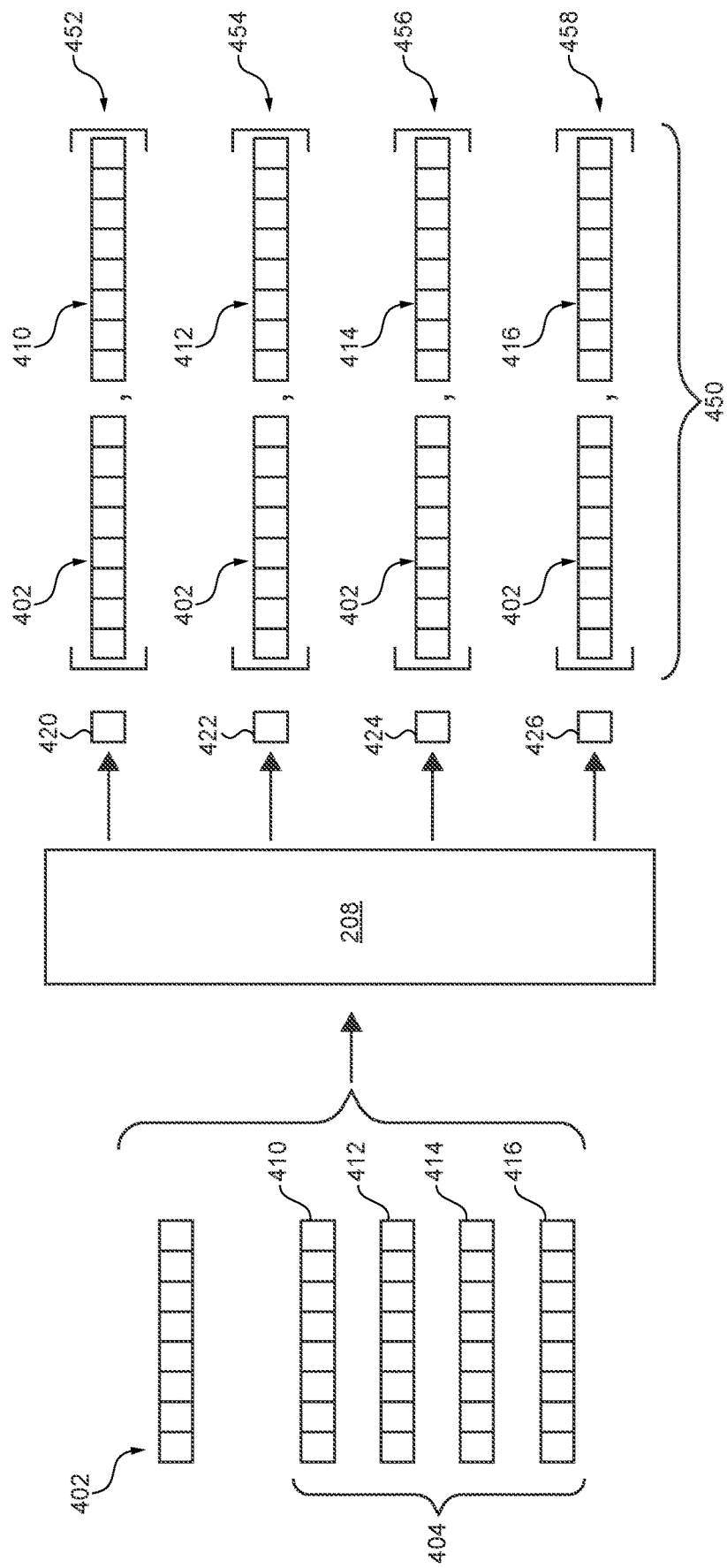
FIG. 4 depicts a computer-implemented procedure for generating a base-line relevance score for a plurality of relevant document to a current query in accordance with non-limiting embodiments of the present technology.

For example, in FIG. 4 there is depicted a current query 402 (in a form of a vector) and a plurality of relevant documents 404 (in a form of vectors) which is identified during the querying procedure 306 as relevant documents for the current query 402. It should be understood that, when referring to queries and documents, these queries and documents may be generated, processed, used and/or stored in a vector form and not necessarily in a text-based form, without departing from the scope of the present technology.

When the server 106 identifies the plurality of relevant documents 404 for the current query 402, which comprises a first relevant document 410, a second relevant document 412, a third relevant document 414 and a fourth relevant document 416, the server 106 may be configured to execute the base-line relevance estimation procedure 208. For example, as mentioned above, at least some of the plurality of relevant document 404 may be identified by the server 106 accessing one or more posting lists of the inverted index stored in the database 110 and which are associated with searchable terms matching at least some terms of the current query 402. In other words, the plurality of relevant documents 404 may be identified from one or more posting lists of the inverted index that are associated with at least one searchable term found in the current query 402.

How the base-line relevance estimation procedure 208 may be executed for the current query 402 and the plurality of relevant documents 404 will now be described.

The server 106 may be configured to input the current query 402 and the plurality of relevant documents 404 into the one or more MLAs that have been trained to estimate a relevance of documents to a given query based on inter alia (i) features of the plurality of relevant documents 404 and (ii) features of the current query 402, as explained above. As a result, the one or more MLAs may be configured to generate respective base-line ranking scores for the plurality of relevant documents 404.

For example, by taking into account the current query 402 and the plurality of relevant documents 404, the one or more MLAs may generate:
  a first base-line ranking score 420 for the first relevant document 410;
  a second base-line ranking score 422 for the second relevant document 412;
  a third base-line ranking score 424 for the third relevant document 414; and
  a fourth base-line ranking score 426 for the fourth relevant document 416.

As previously alluded to, in some embodiments, the server 106 may be configured to rank the plurality of relevant documents 404 based on the respective base-line ranking scores generated by the one or more MLAs. Indeed, with reference to FIG. 7, on the left side thereof, there is depicted a simplified representation 702 of the SERP responsive to the current query 402 and where the plurality of relevant documents 404 is ranked according to the respective base-line ranking scores.

Let it be assumed that, the first base-line ranking score 420 is a topmost base-line ranking score amongst the base-line scores of the plurality of relevant documents 404, the second base-line ranking score 422 is a bottommost base-line ranking score amongst the base-line scores of the plurality of relevant documents 404 and that the third base-line ranking score 424 is inferior to the fourth base-line ranking score 426. Therefore, the server 106 ranks the plurality of relevant documents 404 according to the respective base-line ranking scores, such that:
  the first relevant document 410 is ranked as first on the SERP (preliminary rank being "1"),
  the fourth relevant document 416 is ranked as second on the SERP (preliminary rank being "2"),
  the third relevant document 414 is ranked as third on the SERP (preliminary rank being "3"), and
  the second relevant document 412 is ranked as fourth on the SERP (preliminary rank being "4").

Although the one or more MLAs may be well suited to estimate a relevance of a given document to a given query, in some cases by using the embodiments of the present technology, re-ranking at least some of the plurality of relevant documents 404 on the SERP may potentially result in a more useful SERP as a whole for the user 102 having submitted the current query 402, if compared to the plurality of relevant documents 404 being ranked solely based on the respective base-line ranking scores.

As it will be described herein further below, usage of the stored search pair data 300 by the server 106 for re-ranking the plurality of relevant documents on the SERP and/or for boosting the respective base-line ranking scores may, in at least some cases, improve the usefulness of the SERP as a whole for the user 102 having submitted the current query 402.

Returning to the description of FIG. 4, the server 106 may form a plurality of current search pairs 450 where each one of the plurality of current search pairs 450 includes an indication of the current query 402 and an indication of a respective one of the plurality of relevant documents 404.

In this example, the plurality of current search pairs 450 comprises:
  a first current search pair 452, including the indications of the current query 402 and of the first relevant document 410;
  a second current search pair 454, including the indications of the current query 402 and of the second relevant document 412;
  a third current search pair 456, including the indications of the current query 402 and of the third relevant document 414; and
  a fourth current search pair 458, including the indications of the current query 402 and of the fourth relevant document 416.

Optionally, the server 106 may be configured to associate each one of the plurality of current search pairs 450 with the respective base-line ranking scores as illustrated in FIG. 4.

In some embodiments of the present technology, the server 106 may be configured to execute the pair-wise similarity determination procedure 210 for at least some of the plurality of current search pairs 450. How the server 106 may be configured to execute the pair-wise similarity determination procedure 210 for the first current search pair 452 will now be described with reference to FIG. 5, however, the server 106 may be configured to execute the pair-wise similarity determination procedure 210 for other current search pairs of the plurality of current search pairs 450 in a similar manner, without departing from the scope of the present technology.

Figure 5:
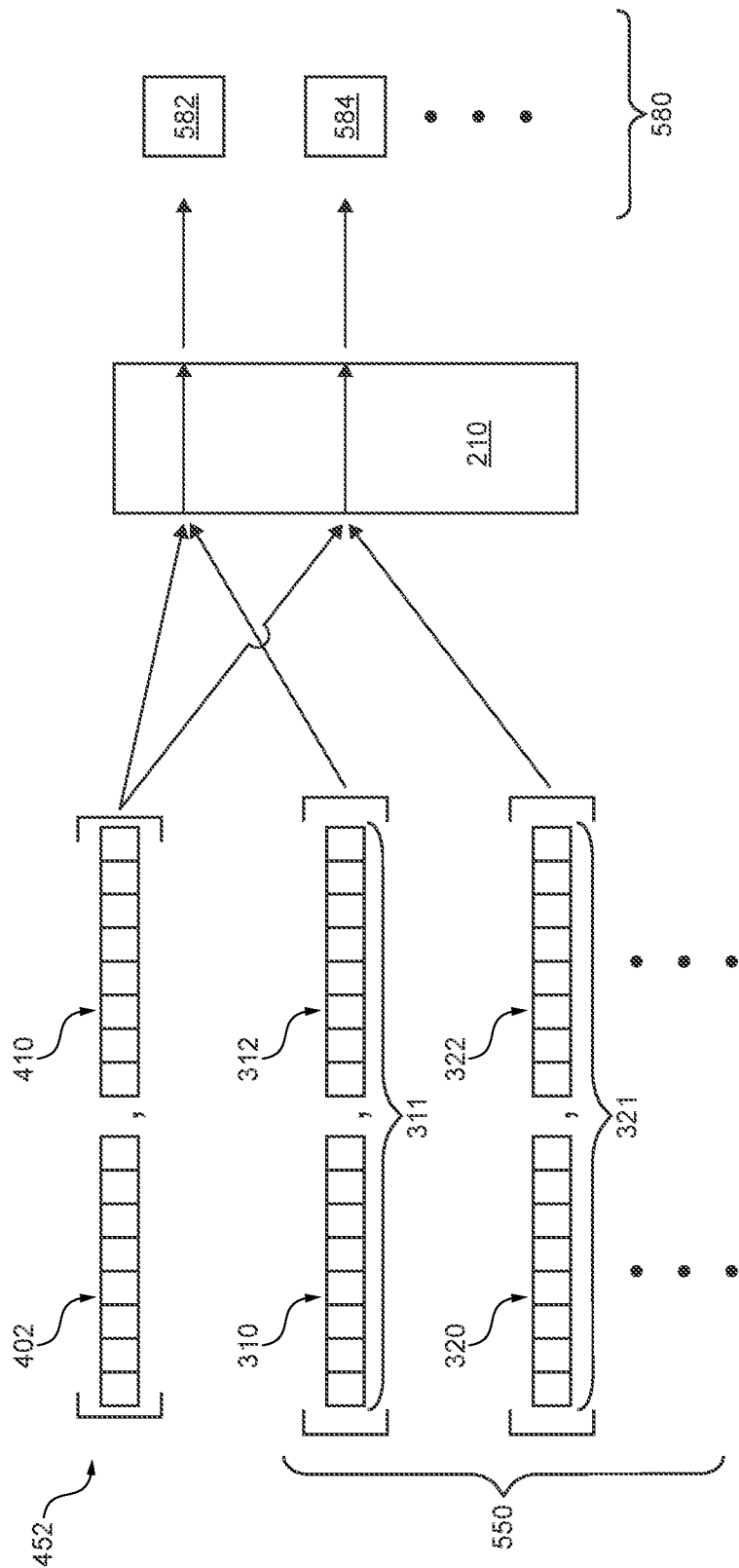
FIG. 5 depicts a computer-implemented procedure for determining a pair-wise similarity between a current search pair and a stored search pair in accordance with non-limiting embodiments of the present technology.

In FIG. 5, there is depicted the first current search pair 452 and a plurality of stored search pairs 550, which are used by the server 106 during the pair-wise similarity determination procedure 210.

For example, the server 106 may be configured to retrieve or extract the plurality of stored search pairs 550 from the respective ones of the plurality of stored search pair records 350 (see FIG. 3). As such, as an example only, the plurality of stored search pairs 550 may comprise the first stored search pair 311, the second stored search pair 321, and other stored search pairs available from the database 110 (see FIG.

1). For example, the server 106 may retrieve or extract a pre-determined number of stored search pairs from the plurality of stored search pair records 350. In another example, the server 106 may retrieve or extract all stored search pairs from the plurality of stored search pair records 350, without departing from the scope of the present technology.

It is contemplated that the server 106 may be configured to retrieve given stored search pair records for use of the respective stored search pairs during the pair-wise similarity determination procedure 210 and for use of the respective pair-specific values during the rank-adjustment score determination procedure 212. It is also contemplated that the server 106 may be configured to extract from the given stored search pair records the respective stored search pairs for use thereof during the pair-wise similarity determination procedure 210 and then extract from the given stored search pair records the respective pair-specific values for use thereof during the rank-adjustment score determination procedure 212.

It can be said that the server 106 is configured to perform a comparison between the first current search pair 452 and each one of the plurality of stored search pairs 550 in a "pair-wise manner". This means that the server 106 may determine a plurality of similarity values 580 that are indicative of a pair-wise similarity between a given pair of respective search pairs (one of the given pair being a given current search pair and an other one of the given pair being a given stored search pair).

For example, the server 106 may determine a first similarity value 582 that is indicative of a pair-wise similarity between first current search pair 452 and the first stored search pair 311. In another example, the server 106 may determine a second similarity value 584 that is indicative of a pair-wise similarity between first current search pair 452 and the second stored search pair 321. It is contemplated that the pair-wise similarity may be indicative of how similar the given queries from the pair of search pairs are. It is contemplated that the pair-wise similarity may be indicative of how similar the given documents from the pair of search pairs are. It is also contemplated that the pair-wise similarity may be indicative of how similar a combination of the given queries and the given documents from the pair of search pairs is.

In some embodiments, the server 106 may determine the pair-wise similarity between first current search pair 452 and the first stored search pair 311 based on a similarity between the current query 402 and the first query 310. For example, the server 106 may be configured to determine a scalar product between the vector form of the current query 402 and the vector form of the first query 310. In another example, the server 106 may be configured to determine a vectorial distance between the vector form of the current query 402 and the vector form of the first query 310.

In other embodiments, the server 106 may determine the pair-wise similarity between first current search pair 452 and the first stored search pair 311 based on a similarity between the first relevant document 410 and the first document 312. For example, the server 106 may be configured to determine a scalar product between the vector form of the first relevant document 410 and the vector form of the first document 312. In another example, the server 106 may be configured to determine a vectorial distance between the vector form of the first relevant document 410 and the vector form of the first document 312.

In further embodiments, the server 106 may determine the pair-wise similarity between first current search pair 452 and the first stored search pair 311 based on (i) the similarity between the current query 402 and the first query 310 and (ii) the similarity between the first relevant document 410 and the first document 312. For example, the server 106 may be configured to determine the pair-wise similarity between first current search pair 452 and the first stored search pair 311 by determining a combination (potentially weighted) of (i) the similarity between the current query 402 and the first query 310 and (ii) the similarity between the first relevant document 410 and the first document 312.

In summary, during the pair-wise similarity determination procedure 210 for the first current search pair 452, the server 106 may be configured to determine the plurality of similarity values 580 where each one of the plurality of similarity values 580 is indicative of a respective pair-wise similarity between first current search pair 452 and a respective one of the plurality of stored search pairs 550. It is contemplated that the server 106 may determine a respective plurality of similarity values for each one of the plurality of current search pairs 450 similarly to how the server 106 determines the plurality of similarity values 580 for the first current search pair 452, without departing from the scope of the present technology.

As mentioned above, the server 106 is also configured to execute the rank-adjustment score determination procedure 212. How the server 106 is configured to execute the rank-adjustment score determination procedure 212 for the first current search pair 452 will now be described with reference to FIG. 6, but it should be understood that, the server 106 may be configured to execute the rank-adjustment score determination procedure 212 for other current search pairs of the plurality of current search pairs 450 in a similar manner, without departing from the scope of the present technology.

Figure 6:
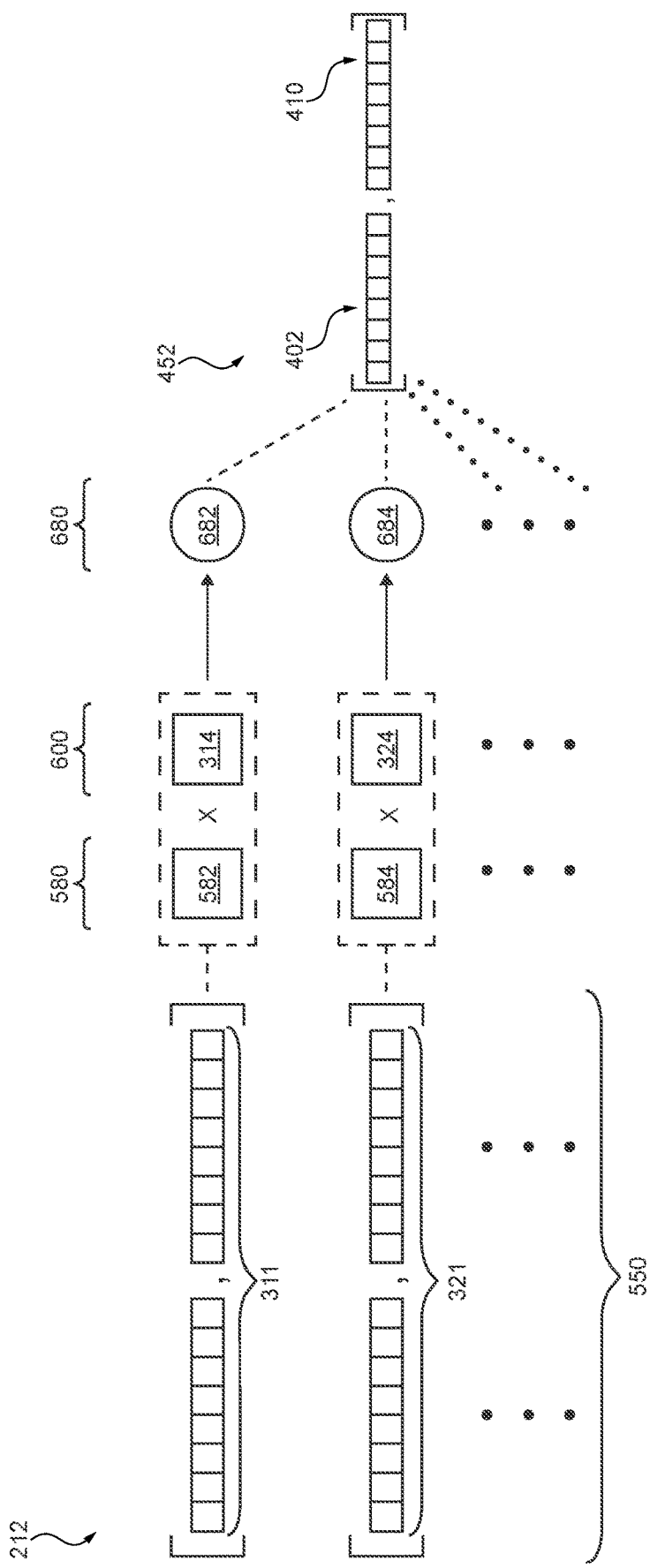
FIG. 6 depicts a computer-implemented procedure for generating a plurality of potential rank-adjustment scores for a current search pair in accordance with non-limiting embodiments of the present technology.

In FIG. 6, there is depicted (i) the plurality of similarity values 580 determined for the first current search pair 452 and which are respectively associated with the plurality of stored search pairs 550, and (ii) a plurality of pair-specific values 600 which correspond to the pair-specific values stored in the database 110 for the plurality of stored search pairs 550.

For example, the server 106 may retrieve or extract the plurality of pair-specific values 600 from the respective ones of the plurality of stored search pair records 350 (see FIG. 3). As such, as an example, the plurality of pair-specific values 600 may comprise the first pair-specific value 314 associated with the first stored search pair 311, the second pair-specific value 324 associated with the second stored search pair 321, and other pair-specific values associated with other ones of the plurality of stored search pairs 550 and which are available from the database 110 (see FIG. 1). For example, the server 106 may retrieve or extract pair-specific values 600 that are respectively associated with the plurality of stored search pairs 550, without departing from the scope of the present technology.

In some embodiments of the present technology, the server 106 is configured to generate a plurality of potential rank-adjustment scores 680 for the first current search pair 452. As depicted in FIG. 6, the server 106 may be configured to generate:

a first potential rank-adjustment score 682 based on (i) the first similarity value 582 associated with the first stored search pair 311 and (ii) the first pair-specific value 314 associated with the first stored search pair 311;

a second potential rank-adjustment score 684 based on (i) the second similarity value 584 associated with the second stored search pair 321 and (ii) the second pair-specific value 324 associated with the second stored search pair 321; and so on for other ones of the plurality of stored search pairs 550.

Thus, it is contemplated that a given one of the plurality of potential rank-adjustment score 680 is (i) associated with the first current search pair 452 and a respective one of the plurality of stored search pairs 550 and (ii) generated based on a respective one of the plurality of similarity values 580 and based on a respective one of the plurality of pair-specific values 600.

It should be mentioned that a given one of the plurality of potential rank-adjustment scores 680 may be representative of a respective one of the plurality of pair-specific values 600 that is weighted by a respective one of the plurality of similarity values 580. As a result, it can be said that a given one of the plurality of potential rank-adjustment scores 680 is indicative of a usefulness of a respective one of the plurality of stored search pairs 550 weighted by a respective pair-wise similarity between the respective one of the plurality of stored search pairs 550 and the first current search pair 452.

It is contemplated that the server 106 may be configured to generate a given rank-adjustment score for the first current search pair 452 based on at least one of the plurality of potential rank-adjustment scores 680. For example, in some cases, the server 106 may be configured to generate a given rank-adjustment score for the first current search pair 452 by selecting a highest/topmost potential rank-adjustment score from the plurality of potential rank-adjustment scores 680.

In other cases, the server 106 may be configured to generate a given rank-adjustment score for the first current search pair 452 based on a pre-determined number of topmost potential rank-adjustment scores from the plurality of potential rank-adjustment scores 680. For example, the server 106 may be configured to average the pre-determined number of topmost potential rank-adjustment scores in order to generate the given rank-adjustment score for the first current search pair 452.

It is contemplated that in some embodiments of the present technology, the server 106 may be configured to generate the given rank-adjustment score based on a respective plurality of potential rank-adjustment scores by employing a K Nearest Neighbors (KNN) algorithm. Generally speaking, the KNN algorithm is a classification method which allows identifying closest entities to another given entity in a feature space. In this case, the KNN algorithm may allow identifying the closest stored search pairs to a given current search pair. As a result, the server 106 may be configured to generate the given rank-adjustment score based on a given plurality of potential rank-adjustment scores associated with the closest stored search pairs to the given current search pair.

In summary, during the rank-adjustment score determination procedure 212 for the first current search pair 452, the server 106 may be configured to generate the plurality of potential rank-adjustment scores 680 and generate the given rank-adjustment score for the current search pair 452 based on at least one of the plurality of potential rank-adjustment scores 680. It is contemplated that the server 106 may generate a respective plurality of potential rank-adjustment scores and a respective rank-adjustment score for each one of the plurality of current search pairs 450 based on at least one of the respective plurality of potential rank-adjustment scores, similarly to how the server 106 generates the plurality of potential rank-adjustment scores 680 and the given rank-adjustment score for the current search pair 452, without departing from the scope of the present technology.

Figure 7:
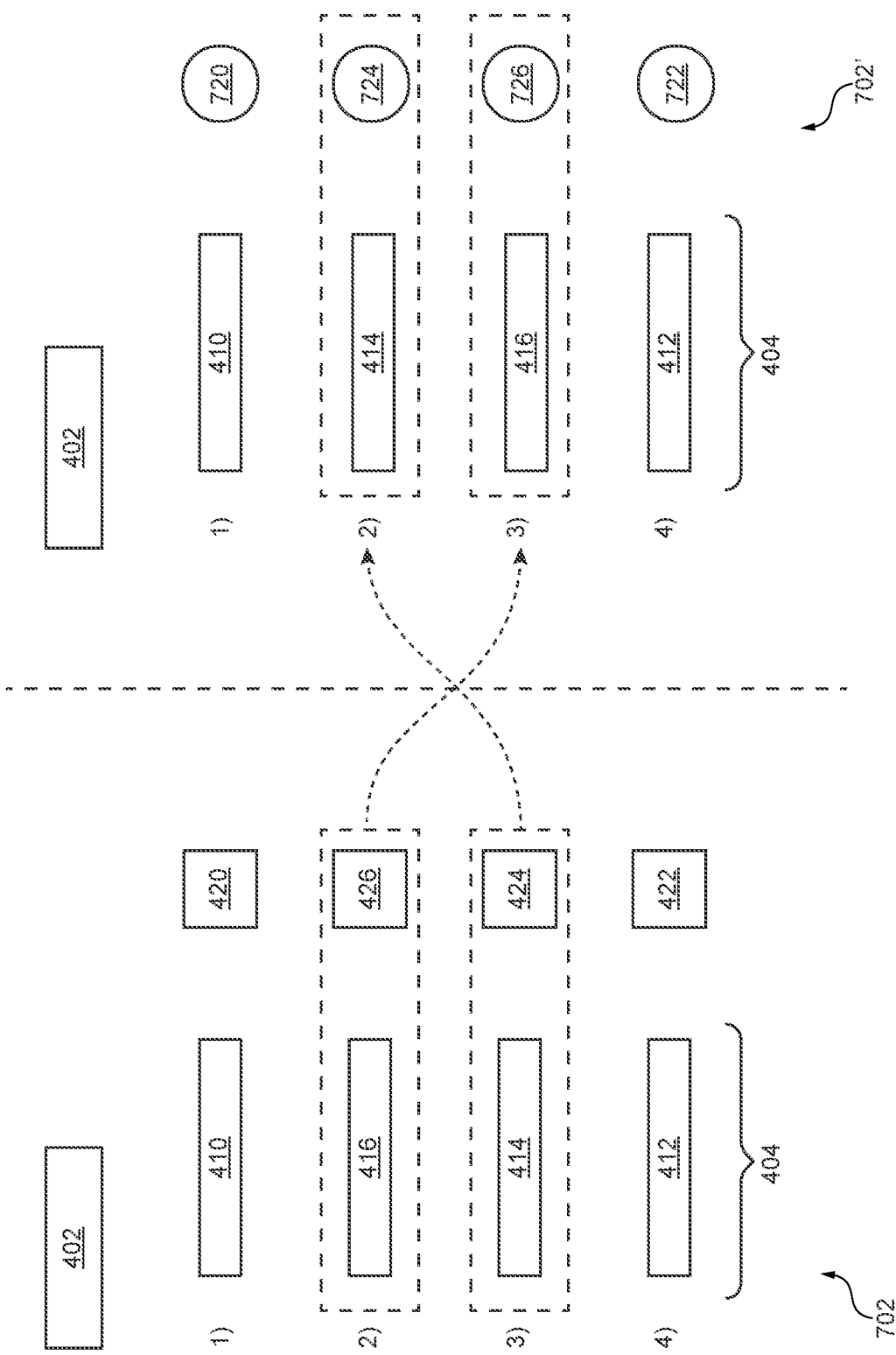
FIG. 7 depicts a simplified representation of the SERP with relevant documents associated with preliminary ranks and another simplified representation of the SERP with relevant document re-ranked using rank-adjustments scores in accordance with non-limiting embodiments of the present technology.

As previously alluded to, the server 106 may be configured to use the respective rank-adjustment scores associated with each one of the plurality of current search pairs 450 in order to re-rank the plurality of relevant documents 404 on the SERP. With reference to FIG. 7, on the right side thereof, there is depicted another simplified representation 702' of the SERP responsive to the current query 402 and where the plurality of relevant documents 404 has been re-ranked by the server 106 using inter alia the respective rank-adjustments scores.

It is contemplated that the server 106 may be configured to generate respective adjusted ranking scores for each one of the plurality of relevant documents 404 based on respective base-line ranking scores and based on respective rank-adjustment scores.

It should be mentioned that the re-ranking is based on at least the respective rank-adjustment scores. As a result, the re-ranking may not require the one or more MLAs as opposed to the initial ranking of the plurality of relevant documents 404 on the SERP. This means that in some embodiments, the re-ranking may be based on a result of the KNN algorithm used to generate the respective rank-adjustment scores in addition to or alternatively to a result of the one or more MLAs.

For example, the server 106 may be configured to generate a first adjusted ranking score 720 for the first relevant document 410 based on the first base-line ranking score 420 and the given rank-adjustment score associated with the first current search pair 452. In another example, the server 106 may be configured to generate a second adjusted ranking score 722 for the second relevant document 412 based on the second base-line ranking score 422 and the given rank-adjustment score associated with the second current search pair 454. Similarly, the server 106 may be configured to generate (i) a third adjusted ranking score 724 for the third relevant document 414, and (ii) a fourth adjusted ranking score 726 for the fourth relevant document 416.

It is contemplated that the server 106 may be configured to generate a given adjusted ranking score by adding a respective rank-adjustment score with a respective base-line ranking score. In other embodiments, the server 106 may be configured to generate a given adjusted ranking score by computing a weighted sum of the respective rank-adjustment score and of the respective base-line ranking score. For example, the rank-adjustment scores may be weighted in order to "re-scale" values thereof to a scale of values of the base-line ranking score.

In some embodiments of the present technology, the server 106 may be configured to re-rank the plurality of relevant documents 404 based on the respective adjusted ranking scores. Let it be assumed that (i) the first adjusted ranking score 720 is the topmost amongst the respective adjusted ranking scores of the plurality of relevant documents 404, (i) the second adjusted ranking score 722 is the bottommost amongst the respective adjusted ranking scores of the plurality of relevant documents 404, and (iii) the third adjusted ranking score 724 is superior to the fourth adjusted ranking score 726.

As a result, in this case, the server 106 re-ranks the plurality of relevant documents 404 on the SERP based on the respective adjusted ranking scores such that the third relevant document 414 is promoted to a higher rank while the fourth relevant document 416 is demoted to a lower rank, if compared to their preliminary ranks as depicted in the simplified representation 702 of the SERP where the plurality of relevant documents 404 have been ranked based on their respective base-line ranking scores.

It is contemplated that in some embodiments of the present technology, the server 106 may be configured to re-rank at least some of the plurality of relevant documents 404 by boosting their respective base-line ranking scores by their respective rank-adjustment scores. As a result, at least one of the plurality of relevant documents 404 may be associated with a rank that is different form its preliminary rank (see the simplified representation 702 of the SERP) when re-ranked based on the respective adjusted ranking scores (e.g., based on respective so-boosted base-line ranking scores/adjusted ranking scores).

The server 106 is then configured to generate the SERP data-packet 160 which comprises data indicative of the SERP where the plurality of relevant documents 404 are re-ranked based on the respective adjusted ranking scores (in accordance with the ranks shown in the another simplified representation 702' of the SERP).

Figure 8:
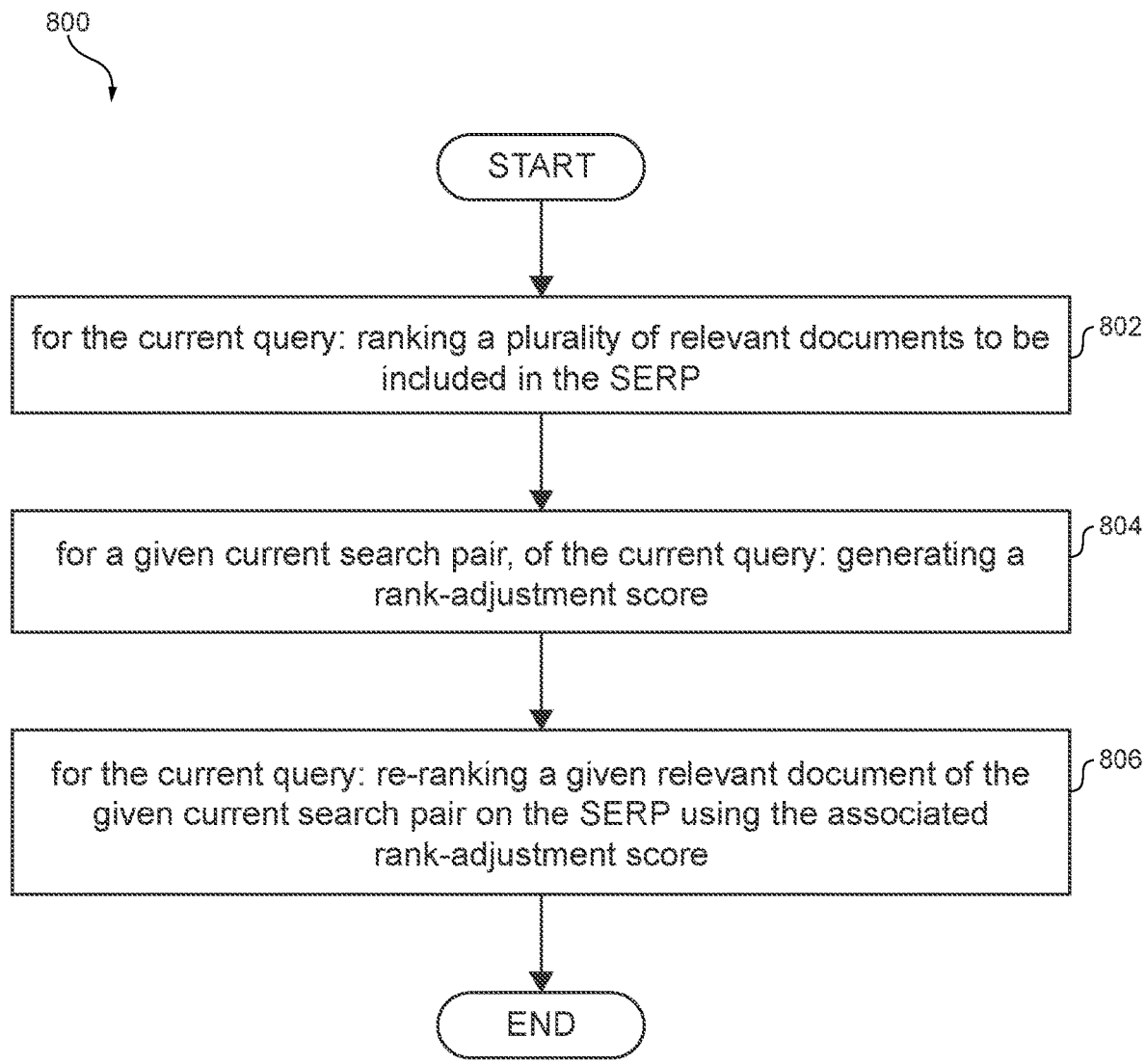
FIG. 8 is a schematic block diagram of a flow chart of a method for ranking documents in response to the current query in accordance with non-limiting embodiments of the present technology.

With reference to FIG. 8, there is depicted a schematic block diagram illustration of a flow chart of a method 800 of ranking documents in response to the current query 402. The documents that are ranked and re-ranked following the execution of the method 800 by the server 106 are to be presented on a given SERP. The indication of the current query 402 may be received via the query data-packet 150 from the device 104 associated with the user 102. Various steps of the method 800 will now be described.

Step 802: For the Current Query, Ranking a Plurality of Relevant Documents to be Included in the SERP The method 800 begins at step 802 with the server 106, for the current query 402, ranking the plurality of relevant documents 404 to be included in the SERP. The server 106 may be configured to employ the one or more MLAs in order to rank the plurality of relevant documents 404.

For example, as depicted in FIG. 4, the server 106 may be configured to employ the one or more MLAs in order to generate:
the first base-line ranking score 420 for the first relevant document 410;
the second base-line ranking score 422 for the second relevant document 412;
the third base-line ranking score 424 for the third relevant document 414; and
the fourth base-line ranking score 426 for the fourth relevant document 416.

As mentioned above, the one or more MLAs have been trained to estimate a relevance of documents to a given query based on inter alia (i) features of the plurality of relevant documents 404 and (ii) features of the current query 402. The respective base-line ranking scores may be indicative of the estimated relevance of a respective relevant document to the current query as determined by the one or more MLAs.

It should be noted that the server 106 may rank the plurality of relevant documents based on the respective base-line ranking scores such that, as depicted in the simplified representation 702 of the SERP of FIG. 7:
the first relevant document 410 is ranked as first on the SERP (preliminary rank being "1"),
the fourth relevant document 416 is ranked as second on the SERP (preliminary rank being "2"),
the third relevant document 414 is ranked as third on the SERP (preliminary rank being "3"), and
the second relevant document 412 is ranked as fourth on the SERP (preliminary rank being "4").

Step 804: For a Given Current Search Pair, of the Current Query, Generating a Rank-Adjustment Score The method 800 continues to step 804 with the server 106 generating a given rank-adjustment score for a given current search pair. It should be understood that the current query and each respective one of the plurality of relevant documents 404 form a respective current search pair from the plurality of current search pairs 450 (see FIG. 4).

In some embodiments of the present technology, it is contemplated that the server 106 may be configured to execute the step 804 for each one of the plurality of current search pairs 450 associated with the current query 402, without departing from the scope of the present technology.

In the example of the first current search pair 452, the server 106 may be configured to generate a respective rank-adjustment score for the first current search pair 452 and which is associated with a given stored search pair of the plurality of stored search pairs 550. For example, the server 106 may be configured to retrieve or extract the plurality of stored search pairs 550 from the respective ones of the plurality of stored search pair records 350 (see FIG. 3).

The respective rank-adjustment score for the first current search pair 452 is generated by the server 106 based on a respective pair-specific value of the given stored search pair and based on the pair-wise similarity between the first current search pair 452 and the given stored search pair.

In some embodiments, in order to generate the rank-adjustment score for the first current search pair 452, the server 106 may be configured to generate the plurality of potential rank-adjustment scores 680 (see FIG. 6) associated with respective ones of the plurality of stored search pairs 550 based on (i) the respective pair-specific values of the plurality of stored search pairs 550 and (ii) the pair-wise similarity between the first current search pair 452 and the respective stored search pairs of the plurality of stored search pairs 550 (see FIG. 5).

For the pair-wise similarity between the first current search pair 452 and the respective stored search pairs of the plurality of stored search pairs 550, it can be said that the server 106 may be configured to perform a comparison between the first current search pair 452 and each one of the plurality of stored search pairs 550 in a "pair-wise manner". For example, the server 106 may determine the first similarity value 582 that is indicative of a pair-wise similarity between first current search pair 452 and the first stored search pair 311. In another example, the server 106 may determine the second similarity value 584 that is indicative of a pair-wise similarity between first current search pair 452 and the second stored search pair 321.

It is contemplated that the server 106 may be configured to determine the pair-wise similarity between first current search pair 452 and a given stored search pair based on at least one of (i) the similarity between the current query 402 and the given query of the given stored search pair and (ii) the similarity between the first relevant document 410 and the given document of the given stored search pair.

In some embodiments, the server 106 may be configured to select a highest/topmost potential rank-adjustment score from the plurality of potential rank-adjustment scores 680 as the respective rank-adjustment score for the first current search pair.

In other embodiments, the server 106 may be configured to select a pre-determined number of highest/topmost potential rank-adjustment scores from the plurality of potential rank-adjustment scores 680. In such a case, the server 105 may average these highest/topmost potential rank-adjustment scores from the plurality of potential rank-adjustment scores 680 to determine the respective rank-adjustment score for the first current search pair 452.

As mentioned above, the server 106 may be configured to generate a respective rank-adjustment score for each one of the plurality of current search pairs 450. The server 106 may also use the respective rank-adjustment scores for re-ranking the respective relevant documents of the respective ones of the plurality of current search pairs 450 on the SERP for the current query 402.

Step 806: For the Current Query, Re-Ranking a Given Relevant Document of the Given Current Search Pair on the SERP Using the Associated Rank-Adjustment Score The method 800 continues to step 806 with the server 106, for the current query, re-ranking the given relevant document of the given current search pair on the SERP using the associated rank-adjustment score such that the given relevant document is associated with a rank on the SERP that is different from the respective preliminary rank on the SERP.

For example, with reference to FIG. 7, the another simplified representation 702' of the SERP responsive to the current query 402 shows the plurality of relevant documents 404 that has been re-ranked by the server 106 using inter alia the respective rank-adjustments scores.

It is contemplated that the server 106 may be configured to generate respective adjusted ranking scores for each one of the plurality of relevant documents 404 based on respective base-line ranking scores and based on respective rank-adjustment scores. In other words, the server 106 may be configured to re-rank the plurality of relevant documents 404 on the SERP with respect to each other for the current query 402 based on a combination of (i) the respective rank-adjustment scores and (ii) respective base-line ranking scores determined by the one or more MLAs.

For example, the server 106 may be configured to generate the first adjusted ranking score 720 for the first relevant document 410 based on the first base-line ranking score 420 and the given rank-adjustment score associated with the first current search pair 452. In another example, the server 106 may be configured to generate the second adjusted ranking score 722 for the second relevant document 412 based on the second base-line ranking score 422 and the given rank-adjustment score associated with the second current search pair 454. Similarly, the server 106 may be configured to generate (i) the third adjusted ranking score 724 for the third relevant document 414, and (ii) the fourth adjusted ranking score 726 for the fourth relevant document 416.

In some embodiments of the present technology, the server 106 may be configured to re-rank the plurality of relevant documents 404 based on the respective adjusted ranking scores. As a result, in this case, the server 106 re-ranks the plurality of relevant documents 404 on the SERP based on the respective adjusted ranking scores such that the third relevant document 414 is promoted to a higher rank while the fourth relevant document 416 is demoted to a lower rank, if compared to their preliminary ranks as depicted in the simplified representation 702 of the SERP where the plurality of relevant documents 404 have been ranked based on their respective base-line ranking scores.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of ranking documents in response to a current query, the documents to be presented on a search engine results page (SERP), the current query having been received from a user device associated with a user, the SERP to be displayed to the user by the user device, the method executable by a server communicatively coupled to the user device and having access to a database, the database storing a plurality of stored search pairs in association with respective pair-specific values,
a given pair-specific value for a given stored search pair being indicative of a usefulness of a given document in the given stored search pair for a given query in the given stored search pair,
the method comprising:
for the current query:
ranking, by the server implementing a Machine Learning Algorithm (MLA), a plurality of relevant documents to be included in the SERP responsive to the current query, the plurality of relevant documents being associated with respective preliminary ranks on the SERP,
the current query and a respective one of the plurality of relevant documents forming a respective current search pair;
for a given current search pair:
generating, by the server, a rank-adjustment score associated with a given stored search pair of the plurality of stored search pairs based on:
(i) the pair-specific value of the given stored search pair, and
(ii) a pair-wise similarity between the current search pair and the given stored search pair;
re-ranking, by the server, a given relevant document of the given current search pair on the SERP using the associated rank-adjustment score such that the given relevant document is associated with a rank on the SERP that is different from the respective preliminary rank on the SERP.

2. The method of claim 1, wherein the given stored search pair is selected such that the rank-adjustment score for the given current search pair is a highest one amongst the plurality of stored search queries.

3. The method of claim 1, wherein, for the given current search pair, the generating the rank-adjustment score comprises:
generating, by the server, a plurality of potential rank-adjustment scores associated with respective ones of the plurality of stored search pairs based on (i) the pair-specific value of a respective stored search pair and (ii) a pair-wise similarity between the given current search pair and the respective stored search pair; and
selecting, by the server, a highest one amongst the plurality of potential rank-adjustment scores as the rank-adjustment score.

4. The method of claim 1, wherein, for the given current search pair, the generating the rank-adjustment score comprises:

generating, by the server, a plurality of potential rank-adjustment scores associated with respective ones of the plurality of stored search pairs based on (i) the pair-specific value of a respective stored search pair and (ii) a pair-wise similarity between the given current search pair and the respective stored search pair; and selecting, by the server, a pre-determined number of topmost ones of the plurality of potential rank-adjustment scores as the rank-adjustment score.

5. The method of claim 4, wherein the selecting further comprises averaging the topmost ones of the plurality of potential rank-adjustment scores to determine the rank-adjustment score.

6. The method of claim 1, wherein the method further comprises:
generating, by the server, a respective rank-adjustment score for each current search pair; and
using, by the server, the rank-adjustment scores for re-ranking the relevant documents of the respective current search pairs on the SERP for the current query.

7. The method of claim 6, wherein the using the rank-adjustment scores comprises:
re-ranking, by the server, the relevant documents on the SERP with respect to each other for the current query based on a combination of (i) the respective rank-adjustment scores and (ii) respective base-line ranking scores determined by the MLA.

8. The method of claim 1, wherein the stored search pairs is one of: a past search pair and an assessor-marked search pair.

9. The method of claim 7, wherein the respective base-line ranking scores are determined by the MLA based on (i) features of the respective relevant documents and (ii) features of the current query.

10. The method of claim 1, wherein the method further comprises determining the pair-wise similarity between the current search pair and the given stored search pair based on at least one of (i) a similarity of the current query with a given query of the given stored search pair and (ii) a similarity of the respective relevant document of the given current search pair and the respective document of the given stored search pair.

11. A server for ranking documents in response to a current query, the documents to be presented on a search engine results page (SERP), the current query having been received from a user device associated with a user, the SERP to be displayed to the user by the user device, the server being communicatively coupled to the user device and having access to a database, the database storing a plurality of stored search pairs in association with respective pair-specific values,
a given pair-specific value for a given stored search pair being indicative of a usefulness of a given document in the given stored search pair for a given query in the given stored search pair,
the server being configured to:
for the current query:
rank, by implementing a Machine Learning Algorithm (MLA), a plurality of relevant documents to be included in the SERP responsive to the current query, the plurality of relevant documents being associated with respective preliminary ranks on the SERP, the current query and a respective one of the plurality of relevant documents forming a respective current search pair;

for a given current search pair:
generate a rank-adjustment score associated with a given stored search pair of the plurality of stored search pairs based on:
(iii) the pair-specific value of the given stored search pair, and
(iv) a pair-wise similarity between the current search pair and the given stored search pair;
re-rank a given relevant document of the given current search pair on the SERP using the associated rank-adjustment score such that the given relevant document is associated with a rank on the SERP that is different from the respective preliminary rank on the SERP.

12. The server of claim 11, wherein the given stored search pair is selected such that the rank-adjustment score for the given current search pair is a highest one amongst the plurality of stored search queries.

13. The server of claim 11, wherein, for the given current search pair, the server configured to generate the rank-adjustment score comprises the server being configured to:
generate a plurality of potential rank-adjustment scores associated with respective ones of the plurality of stored search pairs based on (i) the pair-specific value of a respective stored search pair and (ii) a pair-wise similarity between the given current search pair and the respective stored search pair; and
select a highest one amongst the plurality of potential rank-adjustment scores as the rank-adjustment score.

14. The server of claim 11, wherein, for the given current search pair, the server configured to generate the rank-adjustment score comprises the server being configured to:
generate a plurality of potential rank-adjustment scores associated with respective ones of the plurality of stored search pairs based on (i) the pair-specific value of a respective stored search pair and (ii) a pair-wise similarity between the given current search pair and the respective stored search pair; and
select a pre-determined number of topmost ones of the plurality of potential rank-adjustment scores as the rank-adjustment score.

15. The server of claim 14, wherein the server configured to select further comprises the server being configured to average the topmost ones of the plurality of potential rank-adjustment scores to determine the rank-adjustment score.

16. The server of claim 11, wherein the server is further configured to:
generate a respective rank-adjustment score for each current search pair; and
use the rank-adjustment scores for re-ranking the relevant documents of the respective current search pairs on the SERP for the current query.

17. The server of claim 16, wherein the server configured to use the rank-adjustment scores comprises the server being configured to:
re-rank the relevant documents on the SERP with respect to each other for the current query based on a combination of (i) the respective rank-adjustment scores and (ii) respective base-line ranking scores determined by the MLA.

18. The server of claim 11, wherein the stored search pairs is one of: a past search pair and an assessor-marked search pair.

19. The server of claim 17, wherein the respective base-line ranking scores are determined by the MLA based on (i) features of the respective relevant documents and (ii) features of the current query.

20. The server of claim 11, wherein the server is further configured to determine the pair-wise similarity between the current search pair and the given stored search pair based on at least one of (i) a similarity of the current query with a given query of the given stored search pair and (ii) a similarity of the respective relevant document of the given current search pair and the respective document of the given stored search pair.

\* \* \* \* \*